(12) United States Patent
Sartori et al.

(10) Patent No.: US 9,974,077 B2
(45) Date of Patent: May 15, 2018

(54) SYSTEM AND METHOD FOR COMMUNICATING RESOURCE ALLOCATION FOR D2D

(71) Applicant: Futurewei Technologies, Inc., Plano, TX (US)

(72) Inventors: Philippe Sartori, Plainfield, IL (US); Brian Classon, Palatine, IL (US); Vipul Desai, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 38 days.

(21) Appl. No.: 14/843,539

(22) Filed: Sep. 2, 2015

(65) Prior Publication Data

US 2016/0073408 A1 Mar. 10, 2016

Related U.S. Application Data

(60) Provisional application No. 62/046,027, filed on Sep. 4, 2014.

(51) Int. Cl.
*H04W 4/00* (2009.01)
*H04W 72/04* (2009.01)
(Continued)

(52) U.S. Cl.
CPC ..... *H04W 72/0453* (2013.01); *H04W 76/023* (2013.01); *H04W 88/02* (2013.01)

(58) Field of Classification Search
None
See application file for complete search history.

(56) References Cited

U.S. PATENT DOCUMENTS

2013/0223356 A1 8/2013 Khoshnevis et al.
2014/0185530 A1 7/2014 Kuchibhotla et al.
(Continued)

FOREIGN PATENT DOCUMENTS

CN 103188742 A 7/2013
GB 2497589 A 6/2013
(Continued)

OTHER PUBLICATIONS

3GPP TS 36.212 V12.1.0 (Jun. 2014),3rd Generation Partnership Project;Technical Specification Group Radio Access Network;Evolved Universal Terrestrial Radio Access (E-UTRA);Multiplexing and channel coding(Release 12),total 89 pages.

*Primary Examiner* — Brandon Renner
(74) *Attorney, Agent, or Firm* — Futurewei Technologies, Inc.

(57) ABSTRACT

When the frequency resource allocation is conveyed on a bandwidth that is different from a bandwidth on which the frequency resource allocation is sent, a receiving D2D UE needs to understand the resource allocations. A resource allocation method for device-to-device resource allocation is provided according to an example. The resource allocation method includes a first D2D user equipment (UE) receiving a downlink control information (DCI) from an access point, wherein the DCI comprises a first D2D frequency allocation and the first D2D frequency allocation comprises a first resource allocation field for transmission of data; setting a second resource allocation field of a second D2D frequency allocation of a sidelink control information (SCI) format according to the first resource allocation field; transmitting the SCI format to one or more additional D2D UEs; and transmitting the data on the resource according to the second D2D resource allocation.

16 Claims, 9 Drawing Sheets

Transmitting D2D

(51) Int. Cl.
*H04W 76/02* (2009.01)
*H04W 88/02* (2009.01)

(56) References Cited

U.S. PATENT DOCUMENTS

| | | | |
|---|---|---|---|
| 2014/0198747 A1* | 7/2014 | Ouchi | H04L 5/0053 |
| | | | 370/329 |
| 2014/0342747 A1 | 11/2014 | Lee et al. | |
| 2016/0156423 A1* | 6/2016 | Lim | H04B 15/00 |
| | | | 370/276 |
| 2016/0255647 A1* | 9/2016 | Zhu | H04W 72/1278 |
| | | | 370/329 |
| 2017/0013628 A1* | 1/2017 | Kim | H04J 11/0026 |
| 2017/0033908 A1* | 2/2017 | Hwang | H04L 5/00 |
| 2017/0048829 A1* | 2/2017 | Kim | H04W 76/023 |

FOREIGN PATENT DOCUMENTS

| | | |
|---|---|---|
| WO | 2013109100 A1 | 7/2013 |
| WO | 2014047905 A1 | 4/2014 |

\* cited by examiner

SYSTEM AND METHOD FOR COMMUNICATING RESOURCE ALLOCATION FOR D2D

This application claims the benefit of U.S. Provisional Application No. 62/046,027, filed on Sep. 4, 2014, entitled "Frequency Resource Allocation for D2D" which application is hereby incorporated herein by reference.

TECHNICAL FIELD

The present invention relates to a system and method for wireless communications, and, in particular embodiments, to a system and method for a system and method for communicating resource allocation for device-to-device (D2D) communications.

BACKGROUND

Device-to-device (D2D) technology is getting a lot of attention because of its ability to offer new services, improve system throughput, and offer a better user experience. Standardization work is ongoing in 3GPP for LTE release-12.

In the field of mobile networks, especially in radio access networks, there has been increasing demand for heterogeneous networks, where different types of access points and mobile devices communicate with each other. In addition, direct device-to-device (D2D) communication may be used to further boost the network capacity. D2D communication refers to a communication mode between two or more user equipments (UEs) that does not include, or does not always include, an access point (AP) in a communication path between or among the UEs. D2D communication is also called proximity service (ProSe) communication. Proximity service identifies a UE that is in proximity of another UE.

In a communication network where different types of communication links share a communication resource, they may undesirably interfere with each other. For example, when D2D UEs and one or more non-D2D UEs share an uplink band during communications with a Base Transceiver Station (BTS), the D2D UEs and the cellular UE may interfere with each other.

SUMMARY

A resource allocation method for device-to-device resource allocation is provided according to an example. The resource allocation method includes a first D2D user equipment (UE) receiving a downlink control information (DCI) from an access point, wherein the DCI comprises a first D2D frequency allocation and the first D2D frequency allocation comprises a first resource allocation field for transmission of data; setting a second resource allocation field of a second D2D frequency allocation of a sidelink control information (SCI) format according to the first resource allocation field; transmitting the SCI format to one or more additional D2D UEs; and transmitting the data on the resource according to the second D2D resource allocation.

A device-to-device (D2D) UE is provided according to another example. The D2D UE includes a memory storing instructions; and a processor coupled to the memory, wherein when the instructions are executed by the processor, the D2D UE is configured to receive a downlink control information (DCI) from an access point, wherein the DCI comprises a first D2D frequency allocation and the first D2D frequency allocation comprises a first resource allocation field for transmission of data; set a second resource allocation field of a second D2D frequency allocation of a sidelink control information (SCI) format according to the first resource allocation field; transmit the SCI format to one or more additional D2D UEs; and transmit the data on the resource according to the second D2D resource allocation.

BRIEF DESCRIPTION OF THE DRAWINGS

For a more complete understanding of the present invention, and the advantages thereof, reference is now made to the following descriptions taken in conjunction with the accompanying drawings.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The terms used in this application, like "UE" or "device" or "terminal" as D2D devices can also comprise a subscriber, subscriber unit, a subscriber station, a mobile device such as a phone or tablet, a remote station, a mobile station, a system, a remote terminal, an access terminal, a user terminal, a user entity or user equipment (UE), a communication device, a user agent, a user device, a laptop computer, an e-book reader or other devices. The term "UE" in the application also represents a computer-related entity, such as but not limited to hardware, firmware, a combination of hardware and software, or software in execution. The disclosed embodiments also apply to machine-to-machine (M2M) communications. The devices disclosed herein can also mean such kind of machines, like cars, buses, printers, copiers, refrigerators etc.

An access point (AP) can be, for example, a network controller, an evolved NodeB (eNB), a NodeB, a base station, a controller, a relay, a relay node and the like. According to the transmission power and backhaul capability, the access point may also be known as a macro cell, low power node (LPN), relay node, pico cell, and so on.

A D2D communication link is a direct communication between two devices. The direct communication link can be called a D2D link, a proximity service (ProSe) link, a sidelink, or other applicable term. The D2D link will facilitate interoperability between critical public safety networks and ubiquitous commercial networks because of an ability to offer new services, improve system throughput, and offer a better user experience.

Figure 1:
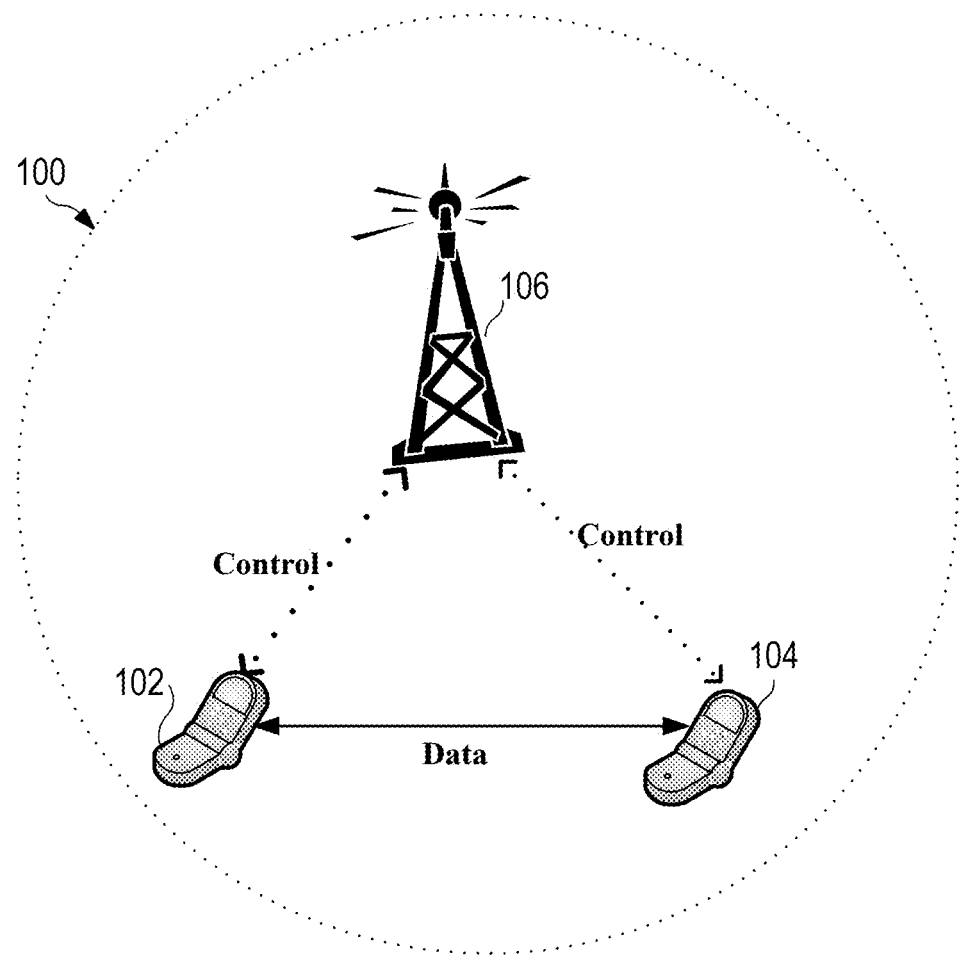
FIG. 1 shows D2D communication in a mobile communication network.

FIG. 1 shows a D2D communication in a mobile communication network. The mobile communication network 100 includes an Access Point (AP) 106, where the AP 106 generates a coverage area (dashed line). One or more user equipments (UEs) 102 and 104 can communicate with the AP 106 and the mobile communication network 100. A first UE 102 can transmit communication messages to a second UE 104 through the AP 106. In D2D, data communications are directly exchanged between participating D2D UEs. Control communications may be directly exchanged in D2D communications or may be relayed through the AP 106.

An access point (AP) 106 in this example schedules the resources used by the first D2D UE 102 to exchange data and control information with the second D2D UE 104. It should be understood that the D2D communication can extend to more than two D2D UEs, but only two UEs are shown and discussed for simplicity. The AP 106 controls transmission power of a scheduling assignment (SA) and data communications for the UE 102, 104, using the physical downlink control channel (PDCCH) or enhanced PDCCH (EPDCCH). The scheduling assignment is an example of control information. Both the D2D UE 102 and the D2D UE 104 are within range of the AP 106 in this example. The first (i.e., initiating) D2D UE 102 sends the resource allocation information to the second D2D UE 104.

Figure 2:
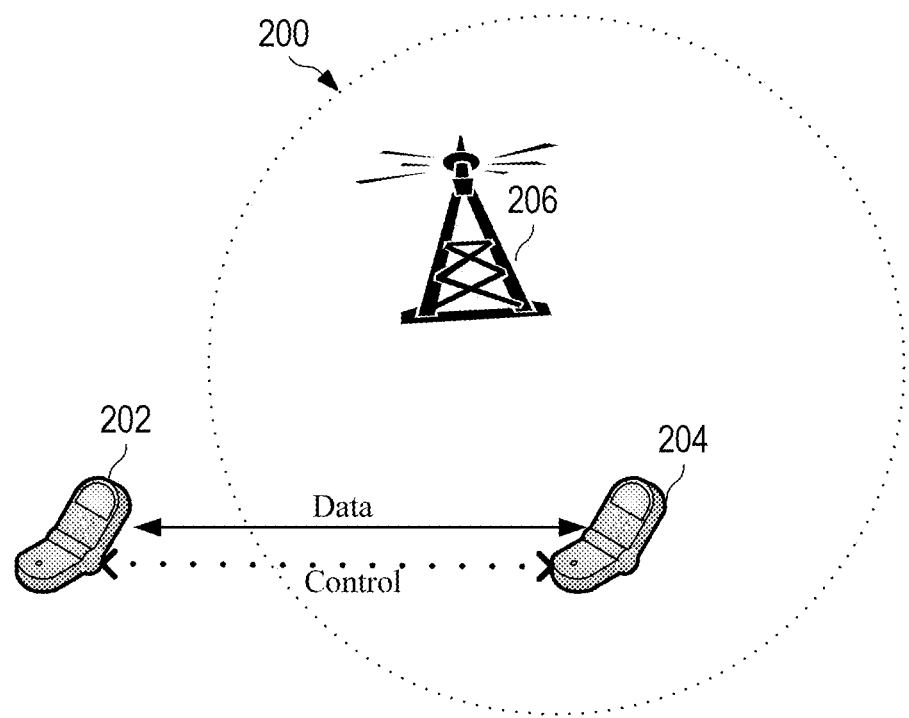
FIG. 2 shows an example of D2D communication in partial mobile network coverage.

FIG. 2 shows an example of D2D communication in partial mobile network coverage. The mobile communication network 200 includes an Access Point (AP) 206, where the AP 206 generates a coverage area (dashed line). A first UE 202 can communicate messages to the AP 206 through a second UE 204. The first UE 202 in this example is out of coverage of the AP 206.

In D2D technology, there are two main operational phases: one is discovery, and the other is communication. Regarding the discovery phase of D2D communications, for example, a UE can attempt to discover neighboring UEs. However, the discovery operation can be carried out by either the UE or the associated AP. Regarding the communication phase among D2D devices, for example, a UE directly communicates with another UE without the data transiting through the AP.

For D2D communication, there are two modes for resource allocation: mode 1 and mode 2. In mode 1, the AP schedules the resources to be used by a D2D UE to transmit direct data and direct control information between D2D UEs. The AP in mode 1 controls transmission power of the transmission of scheduling assignment (SA) and data communications using the physical downlink control channel (PDCCH) or the enhanced PDCCH (EPDCCH). In mode 2, a UE on its own selects resources from resource pools to transmit direct data and direct control information to one or more additional D2D UEs.

For mode 1, the first (i.e., initiating) UE must be within coverage of the AP 206. The other D2D UE or UEs need not be within coverage. For instance, as shown in FIG. 2, UE 202 is out of coverage of the AP 206.

Mode 1 details are illustrated as an example as follows. Let UE1 be the initiating D2D UE, let UE2 be an out-of-coverage D2D UE, and let UE3 be an in-coverage D2D UE. The physical channel that UE1 uses for transmitting D2D data is the Physical Sidelink Shared Channel (PSSCH). The associated control channel is the Physical Sidelink Control Channel (PSCCH). The PSCCH is a broadcast channel, and in release-12, the PSSCH carries broadcast payload.

For example, when in mode 1, UE1 receives the D2D resource allocation in a downlink control information (DCI) sent on the PDCCH/EPDCCH from the AP. The DCI format used is DCI format 5. UE1 then encodes the resource allocation in a Sidelink Control Information (SCI) format 0. The SCI is transmitted on the PSCCH to the other UEs in the D2D scenario. The SCI contains scheduling assignment (SA) information.

DCI format 5 is used for the scheduling of PSCCH, and also contains several SCI format 0 fields used for the scheduling of PSSCH.

For example, the following information is included in and transmitted by means of the DCI format 5:
Resource for PSCCH—6 bits,
SCI format 0 fields:
Frequency hopping flag,
Resource block assignment and hopping resource allocation,
T-RPT index.

For example, in DCI format 0, a resource block assignment included in format 0 is as follows (notations defined in 3GPP TS 36.211/212/213):
Resource block assignment and hopping resource allocation—$\lceil \log_2(N_{RB}^{UL}(N_{RB}^{UL}+1)/2) \rceil$ bits
For PUSCH hopping (resource allocation type 0 only):
NUL_hop MSB bits are used to obtain the value of $\tilde{n}_{PRB}(i)$ as indicated in section 8.4 of 3GPP TS 36.213,
$(\lceil \log_2(N_{RB}^{UL}(N_{RB}^{UL}+1)/2) \rceil) - N_{UL\_hop}$ bits provide the resource allocation of the first slot in the UL subframe.
For non-hopping PUSCH with resource allocation type 0:
$(\lceil \log_2(N_{RB}^{UL}(N_{RB}^{UL}+1)/2) \rceil)$ bits provide the resource allocation in the UL subframe as defined in section 8.1.1 of 3GPP TS 36.213.
Note that $N_{RB}^{UL}$ is the uplink bandwidth configuration expressed in number of resource blocks.

SCI format 0 is used for the scheduling of PSSCH. The following information is included in and transmitted by means of the SCI format 0:
Frequency hopping flag—1 bit,
Resource block assignment and hopping resource allocation—$\lceil \log_2(N_{RB}^{SL}(N_{RB}^{SL}+1)/2) \rceil$ bits:
For PSSCH hopping:
$N_{SL\_hop}$ MSB bits are used to obtain the value of $\tilde{n}_{PRB}(i)$,
$(\lceil \log_2(N_{RB}^{SL}(N_{RB}^{SL}+1)/2) \rceil) - N_{SL\_hop}$ bits provide the resource allocation of the subframe,
For non-hopping PSSCH:
$(\lceil \log_2(N_{RB}^{SL}(N_{RB}^{SL}+1)/2) \rceil)$ bits provide the resource allocation in the subframe as defined in section 8.1.1 of 3GPP TS 36.213,
T-RPT index—7 bits,
Modulation and coding scheme and redundancy version—5 bits,
Timing advance indication—5 bits,
Group destination ID.
Note that $N_{RB}^{SL}$ is the sidelink (SL) bandwidth configuration expressed in number of resource blocks.

Alternatively, the frequency resource allocation conveyed by DCI format 5 is indexed on the UL bandwidth. The frequency resource allocation sent in the SCI format 0 is indexed on the SL bandwidth, potentially different than the UL bandwidth. When the UL bandwidth and the SL bandwidth are different, there is a problem that the receiving D2D UE does not understand the SL and UL resource allocations.

Alternatively, the frequency resource allocation conveyed by DCI format 5 is indexed on the SL bandwidth. The AP maps the SL bandwidth that is needed for transmission. The frequency resource allocation sent in the SCI format 0 is also indexed on the SL bandwidth. When the SL bandwidth assigned by the AP to the D2D UE1 is different from the SL bandwidth used for transmissions between D2D UE1 and D2D UE2, the problem still exists that receiving D2D UE does not understand the resource allocations. The problem is further illustrated below.

Figure 3:
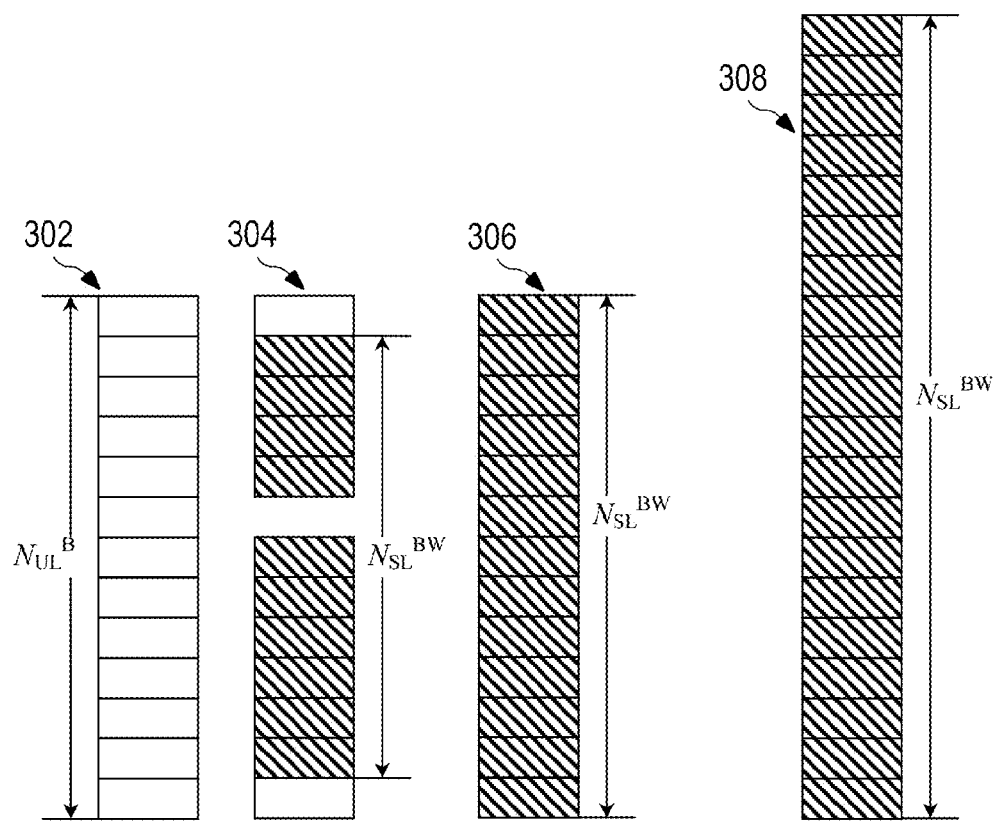
FIG. 3 shows an example of how a sidelink bandwidth is related to an uplink bandwidth.

FIG. 3 shows an example of how the SL bandwidth ($N_{SL}^{BW}$) is related to the UL bandwidth ($N_{UL}^{B}$). In one example, the SL bandwidth 304 is less than the UL bandwidth 302. In another example, the SL bandwidth 306 equals the UL bandwidth 302. In a third example, the SL bandwidth 308 is greater than the UL bandwidth 302. This shows the problem when the UL bandwidth and the SL bandwidth are not equal.

Various embodiments are provided to solve the problem, as follows. An embodiment provides a transmission resource allocation protocol for D2D communication. Various embodiments provide solutions for the initiating D2D UE to encode the resource allocation for the additional D2D UEs. These solutions either provide additional information to the receiving UEs, or translate the UL frequency resource allocation onto another set of frequency resources.

An embodiment provides a solution for D2D resource allocation. An initiating D2D UE receives downlink control information (DCI) from an AP. The DCI may include a first D2D frequency allocation. The first D2D frequency allocation may include a first resource allocation field for transmission of data. The initiating D2D UE sets a second resource allocation field of a second D2D frequency allocation in a sidelink control information (SCI) format according to the first resource allocation field, and transmits the SCI format to other D2D UE(s). The initiating D2D UE transmits the data on the resource according to the second D2D resource allocation. Alternatively, the setting step further includes copying the first D2D frequency allocation field to the second D2D frequency allocation field. Alternatively, the setting step further includes copying and scaling the first D2D frequency allocation field to the second D2D frequency allocation field. Examples of scaling are provided additionally. When an initiating D2D UE is allocated 10 RBs by a network, the network is with 10 MHz bandwidth, scaling allows a second UE to use 20 RBs for a 20 MHz bandwidth. Optionally, if an initiating D2D UE is allocated 10 RBs by a network with 10 MHz bandwidth, scaling allows an initiating UE to modify the number of resource blocks for a 20 MHz bandwidth. Alternatively, the initiating D2D UE transmits the second D2D frequency allocation on the SCI format using a SCI format 0, wherein the SCI format 0 includes a same resource allocation field of the first D2D frequency allocation as received on the DCI.

Alternatively, the initiating D2D UE indicates a first bandwidth by a first value occupying a lowest frequency and a second value occupying a highest frequency corresponding to a physical resource block used for the first resource allocation. The one or more additional D2D UEs locate the first bandwidth according to the first value and the second value.

Alternatively, the first D2D frequency allocation is determined depending on an uplink bandwidth by the AP. Optionally the first D2D frequency allocation is determined based on the uplink bandwidth of the AP. Optionally the AP determines the first D2D frequency allocation. The initiating D2D UE converts the first D2D frequency allocation according to the uplink bandwidth, to the second D2D frequency allocation, according to a SL bandwidth. The SL bandwidth is used for data communication between the first D2D UE and the one or more additional D2D UEs. The first D2D UE transmits a bandwidth of the uplink band on a Physical Sidelink Broadcast Channel (PSBCH).

Alternatively, the first D2D frequency allocation is determined depending on a SL bandwidth by the AP. Optionally the first D2D frequency allocation is determined based on the SL bandwidth of the AP. Optionally the AP determines the first D2D frequency allocation. The first D2D UE transmits a bandwidth of the SL band on a Physical Sidelink Broadcast Channel (PSBCH).

Alternatively, when a first bandwidth of the first resource allocation is different from a second bandwidth of the second resource allocation, the first D2D UE maps the resources corresponding to the first bandwidth onto the resources corresponding to the second bandwidth.

Alternatively, the DCI is carried in a DCI format. The DCI format is DCI format 5 in some examples. The DCI format 5 comprises a field of the SCI format. Fields of DCI format 5 are used for fields of the SCI format.

Alternatively, the DCI format 5 includes a field to schedule a transmission of a Physical Sidelink Control CHannel (PSCCH), and includes a field to schedule a transmission of a Physical Sidelink Shared Channel (PSSCH).

Figure 4:
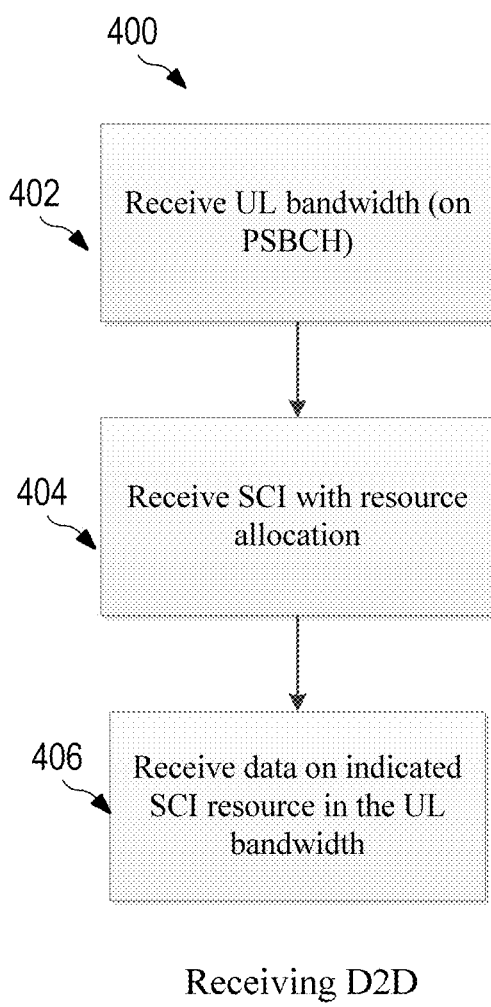
FIG. 4 is a flowchart showing an example of D2D communication from a perspective of a receiving UE.

FIG. 4 is a flowchart 400 showing an example of D2D communication from a perspective of a receiving UE. In optional step 402, the receiving UE receives a UL bandwidth on the PSBCH. In step 404, the receiving UE receives SL control information (SCI) with resource allocation. In step 406, the receiving UE receives data information on an indicated SCI resource in the UL bandwidth.

Figure 5:
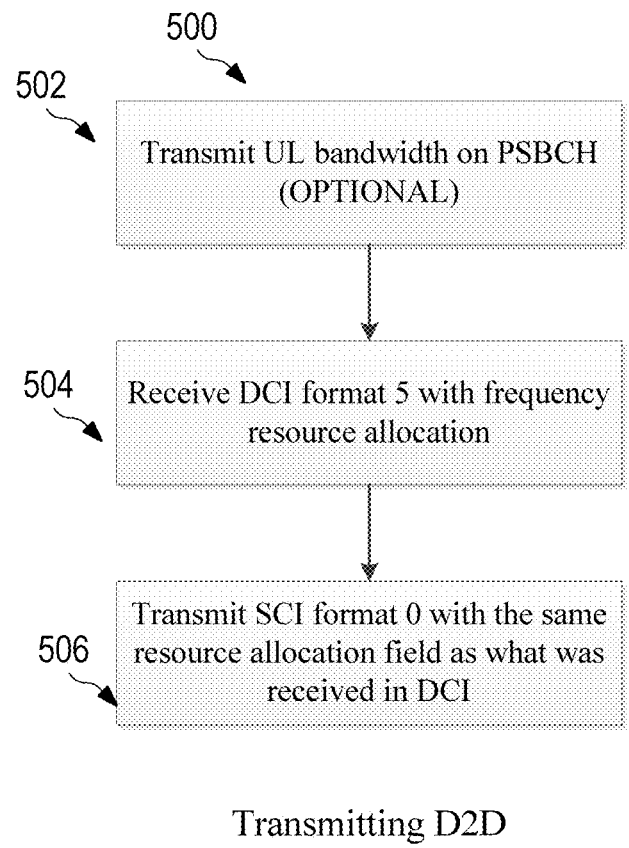
FIG. 5 is a flowchart showing an example of D2D communication from a perspective of a transmitting UE.

FIG. 5 is a flowchart 500 showing an example of D2D communication from a perspective of a transmitting UE. The UE uses the uplink bandwidth. In optional step 502, the initiating UE transmits an uplink (UL) bandwidth on a PSBCH. In step 504, the initiating UE receives DCI format 5 with frequency resource allocation from the AP. In step 506, the initiating UE transmits SCI format 0 with the same resource allocation field as what was received in the DCI format 5.

For example, UE1 receives the frequency allocation on the DCI format 5 and sends it exactly as received on the SCI format 0.

The bandwidth of the uplink (UL) band is provided to the D2D UE1. When the D2D broadcast group is set up, the set of physical resource blocks (PRBs) used on the UL can be communicated to the D2D group. The bandwidth of the uplink band can thus be provided to the D2D UE1, which is among the D2D group of UEs. Alternatively, the AP has the UEs transmitting the D2D synchronization signals (D2DSS) including the UL bandwidth. Following the instructions of the AP, the UEs transmit the D2DSS including the UL bandwidth. The bandwidth of the uplink can thus be provided to the D2D UE1. Similarly, the bandwidth of the SL band is provided by the AP to UE1. In some scenarios, the SL bandwidth signaled from the AP to UE1 can be different than the SL bandwidth used by the group of UEs.

In one example of resource allocation, number of resource block is initiated and the number of resource blocks used by the initiating UE is conveyed. When the UL band or SL band is different; or bandwidth of either UL band or SL band is different, the initiating UE may change the starting number of the resource block. The initiating UE may change the starting number of the resource block in accordance to the SL band that is used between the initiating UE and the one or more additional UEs. The resource allocation information is conveyed to the one or more additional UEs.

Alternatively, the second D2D UE can locate the bandwidth of the uplink according to values of both the highest and lowest frequency of a physical resource block. For example, the bandwidth of uplink is indicated by the first value that occupies the lowest frequency corresponding to the uplink physical resource block. The bandwidth of the uplink band is indicated by the second value, which occupies the highest frequency corresponding to the uplink physical resource block. Then the second D2D UE can locate the bandwidth of the uplink based on these two values.

For example, the lowest frequency of a physical resource block may be named UL_min, which corresponds to the UL PRB occupying the lowest frequency. The highest frequency of a PRB may be named UL_max, which corresponds to the UL_PRB occupying the highest frequency, or equivalently as the number of PRBs are allocated.

UL_min and UL_max can be offset values relative to the D2DSS, for example, the central frequency of the D2DSS. By doing so, a UE receiving UL_min and UL_max can determine where the UL bandwidth is located. Values of UL_min and UL_max can be transmitted on the PD2DSCH, also known as the Physical Sidelink Broadcast Channel (PSBCH).

Figure 6:
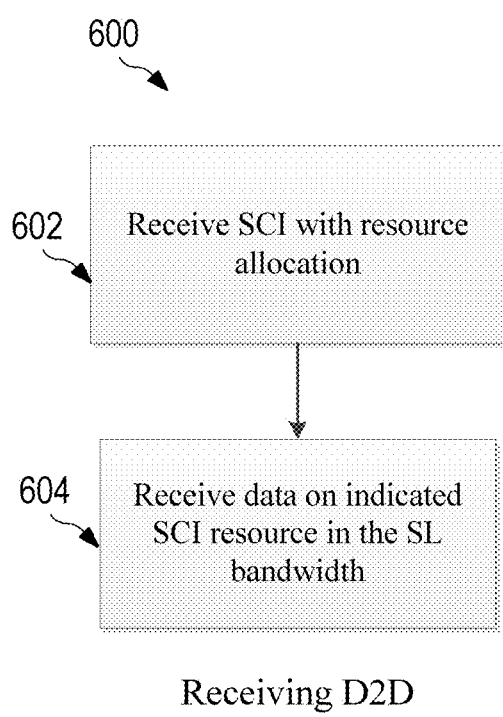
FIG. 6 is a flowchart showing an example of D2D communication from a perspective of a receiving UE.

FIG. 6 is a flowchart 600 showing an example of D2D communication from a perspective of a receiving UE. In step 602, the receiving UE receives the SCI with resource allocation. In step 604, the receiving D2D UE receives data on an indicated SCI resource in the SL bandwidth.

Figure 7:
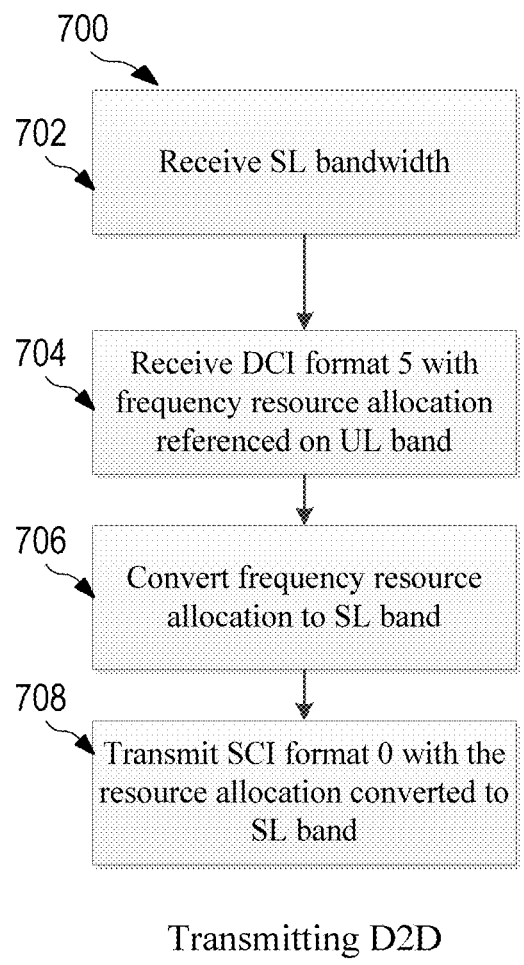
FIG. 7 is a flowchart showing an example of D2D communication from a perspective of a transmitting UE.

FIG. 7 is a flowchart 700 showing an example of D2D communication from a perspective of a transmitting UE. The transmitting UE uses the SL bandwidth. In step 702, the initiating UE receives a SL bandwidth. In step 704, the initiating UE receives DCI format 5 with frequency resource allocation referenced on an uplink (UL) band. In step 706, the frequency resource allocation is converted from the UL band to the SL band. In step 708, the initiating UE transmits SCI format 0 with the resource allocation that has been converted to the SL band.

The bandwidths for the UL band and the SL band might be different. Normally, the SL band is used for data communication between the first D2D UE and one or more other D2D UEs. Alternatively, the D2D UE converts the first D2D frequency allocation from the uplink band to the SL band before transmitting the SCI format.

The frequency allocation conversion procedure can be as follows. Assume that the UL band occupies m+1 PRBs pairs, and that the SL band occupies n+1 PRBs pairs. The SL bandwidth includes the m+1 UL PRBs pairs. The AP sends to the initiating D2D UE a DCI. The DCI can be sent in such as DCI format 5, containing a resource allocation on the UL carrier for the SL transmission. The DCI may also contain a resource allocation field of a SCI format 0, which is normally for SL. The resource allocation is received for PRBs labeled on the UL as Ui, . . . , Ui+k on the UL carrier. These PRBs are labeled as Sj, . . . Sj+k on the SL carrier. UE1 communicates the list Sj . . . Sj+k of the set of n+1 PRBs of the SL bandwidth using the encoding approach of the UL resource allocation. In this way, a receiving UE, knowing only information about the SL band, is capable of identifying the PRBs of resource allocation without having any information about the UL band. In above examples, alternatively, i equals j.

Figure 8:
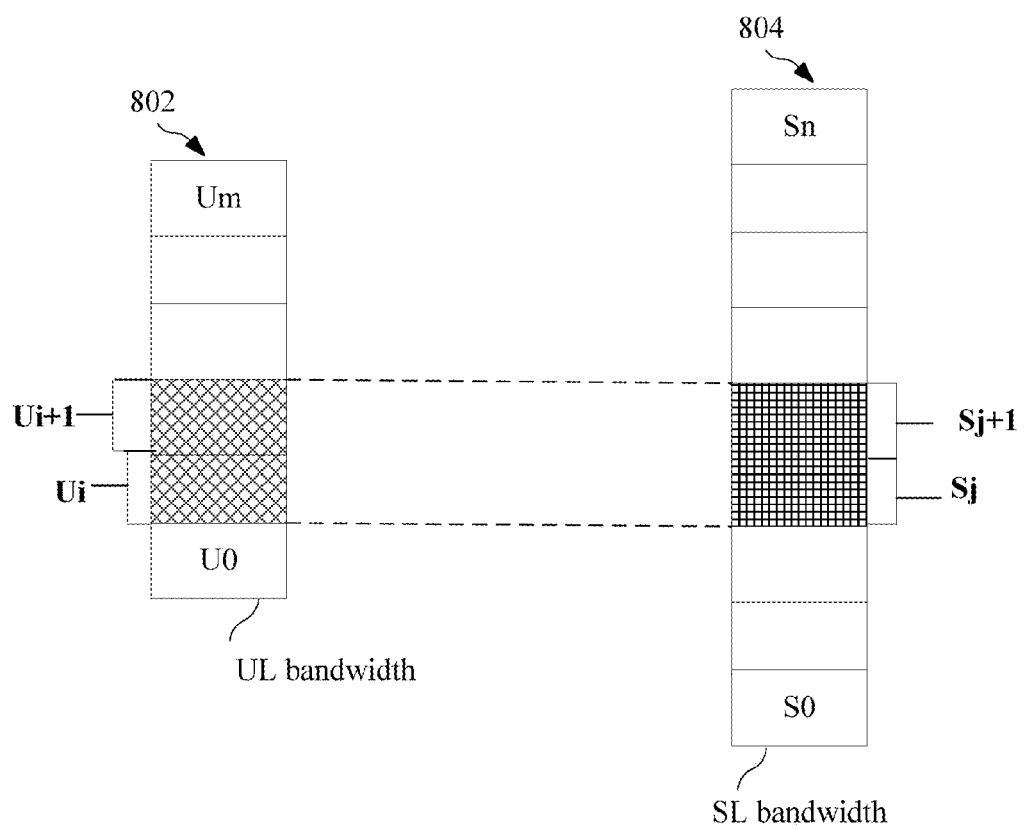
FIG. 8 shows an example of conversion of resource allocation.

FIG. 8 shows an example of conversion of the frequency resource allocation. The procedure of conversion of resource allocation is further illustrated. The received resource allocation is for the UL on the PRB 802 labeled as U0 . . . Um. This resource allocation is then converted to SL on the set of PRBs 804 labeled as S0 . . . Sn. Ui and Ui+1 occupy Sj and Sj+1 on the SL band.

In another example, the information of the SL bandwidth is pre-configured and known to all devices with D2D capabilities. Such information is sent to the initiating D2D UE.

In another example, the SL bandwidth could be the entire frequency band occupied by the commercial carrier. For example, the 2100 MHz band is defined as 2110-2170 MHz DL and 1920-1980 MHz UL. The SL resource allocation can be based on the availability of the entire set of PRBs from 2110-2170 MHz DL and 1920-1980 MH$_z$ UL. The initiating D2D UE then can be aware of the bandwidth of the SL.

Figure 9:
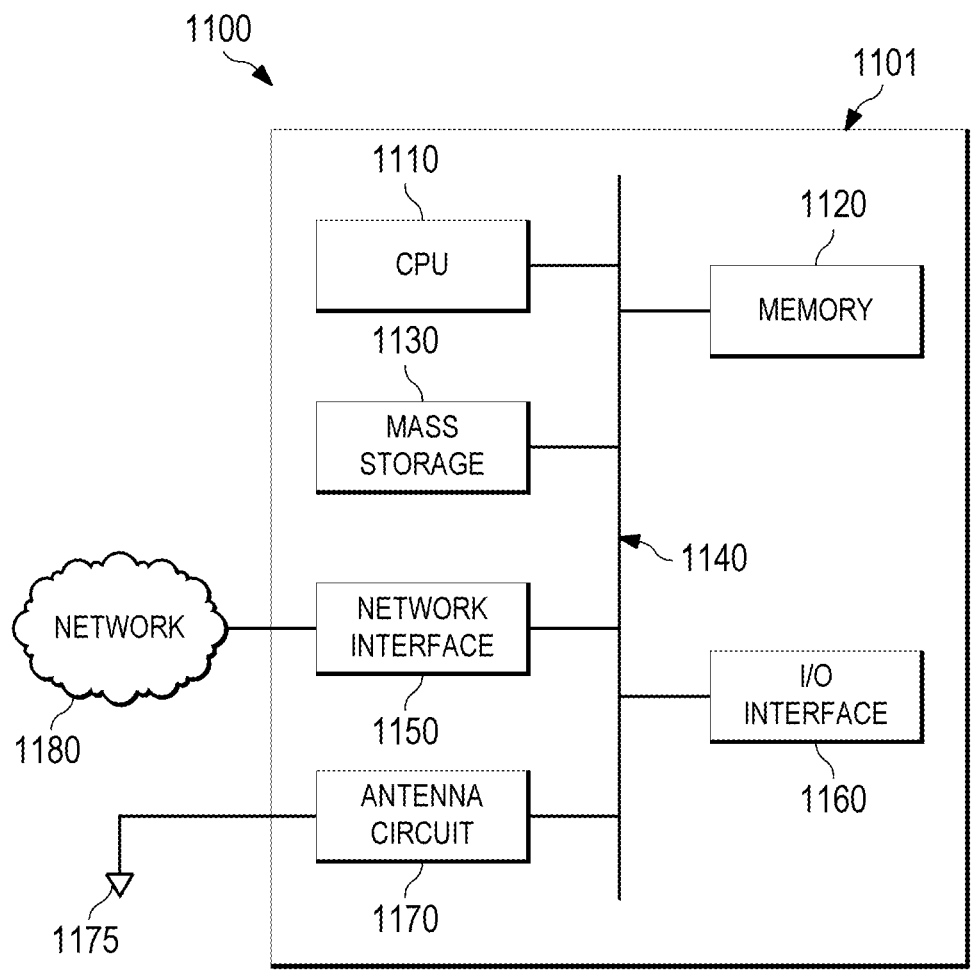
FIG. 9 shows a computing platform that may be used for implementing, for example, the devices and methods described herein, in accordance with any embodiment.

FIG. 9 shows a computing platform 1100 that may be used for implementing, for example, the devices and methods described herein, in accordance with any embodiment. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1101 in the embodiment shown comprises a processing unit equipped with one or more input/output devices, such as a speaker, microphone, mouse, touchscreen, keypad, keyboard, printer, display, and the like (not shown). The processing unit 1100 may include a central processing unit (CPU) 1110, memory 1120, a mass storage device 1130, and an I/O interface 1160, connected to a bus 1140.

The bus 1140 may be one or more of any type of several bus architectures including a memory bus or memory controller, a peripheral bus, video bus, or the like. The CPU 1110 may comprise any type of electronic data processor. The memory 1120 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage 1130 may comprise any type of non-transitory storage device configured to store data, programs, and other information and to make the data, programs, and other information accessible via the bus. The mass storage 1130 may comprise, for example, one or more of a solid state drive, hard disk drive, a magnetic disk drive, an optical disk drive, or the like.

The I/O interface 1160 couples external input and output devices to the processing unit 1100. As illustrated, examples of input and output devices include a display and a mouse/keyboard/printer (not shown) coupled to the I/O interface 1160. Other devices may be coupled to the processing unit 1100, and additional or fewer interface devices may be utilized. For example, a serial interface such as Universal Serial Bus (USB) (not shown) may be used to provide an interface for a printer.

The processing unit also includes one or more network interfaces 1150, which may comprise wired links, such as an Ethernet cable or the like, and/or wireless links to access nodes or different networks 1180. The network interface 1150 allows the processing unit to communicate with remote units via the network 1180. For example, the network interface 1150 may provide wireless communication via one or more transmitters/transmit antennas 1170 and one or more receivers/receive antennas. In an embodiment, the processing unit is coupled to a local-area network or a wide-area network for data processing and communications with remote devices, such as other processing units, the Internet, remote storage facilities, or the like.

For example, a device-to-device (D2D) UE includes a memory that stores instructions and a processor coupled to the memory. When the instructions are executed by the processor, the D2D UE is configured to receive a downlink control information (DCI) from an access point, wherein the DCI comprises a first D2D frequency allocation and the first D2D frequency allocation comprises a first resource allocation field for transmission of data, set a second resource allocation field of a second D2D frequency allocation of a sidelink control information (SCI) format according to the first resource allocation field, transmit the SCI format to one or more additional D2D UEs, and transmit the data on the resource according to the second D2D resource allocation.

The following references are related to subject matter of the present application. Each of these references is incorporated herein by reference in its entirety:
3GPP TS 36.101 Specification v12.4.0 (2014 Jul. 11).
3GPP TS 36.211 Specification v12.2.0 (2014 Jul. 3).
3GPP TS 36.212 Specification v12.1.0 (2014 Jul. 3).
3GPP TS 36.213 Specification v12.2.0 (2014 Jul. 3).
3GPP TS 36.331 Specification v12.2.0 (2014 Jul. 4).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Abbreviations are provided below:
AP Access point
BCH Broadcast CHannel
BTS Base Transceiver Station
CFI Control Format Indicator
CP Cyclic Prefix
CQI Channel Quality Control Information
CRC Cyclic Redundancy Check
CSI Channel State Information
DCI Downlink Control Information
DL-SCH Downlink Shared CHannel
DRA D2D Resource Allocation
eNB evolved NodeB
EPDCCH Enhanced Physical Downlink Control CHannel
FDD Frequency Division Duplexing
HARQ Hybrid Automatic Retransmission Request
HI HARQ Indicator
MCH Multicast CHannel
M2M Machine-to-Machine
PBCH Physical Broadcast CHannel
PCFICH Physical Control Format Indicator CHannel
PCH Paging CHannel
PDCCH Physical Downlink Control CHannel
PDSCH Physical Downlink Shared CHannel
PHICH Physical HARQ Indicator CHannel
PMCH Physical Multicast CHannel
PMI Precoding Matrix Indicator
PRACH Physical Random Access CHannel
PRB Physical Resource Blocks
ProSe Proximity Service
PSBCH Physical Sidelink Broadcast CHannel
PSCCH Physical Sidelink Control CHannel
PSDCH Physical Sidelink Discovery CHannel
PSSCH Physical Sidelink Shared CHannel
PUCCH Physical Uplink Control CHannel
PUSCH Physical Uplink Shared CHannel
RACH Random Access CHannel
RB Resource Block
RI Rank Indication
RRC Radio Resource Control
SA Scheduling Assignment
SCI Sidelink Control Information
SL-BCH Sidelink Broadcast CHannel
SL-DCH Sidelink Discovery CHannel
SL-SCH Sidelink Shared CHannel
SR Scheduling Request
SRS Sounding Reference Signal
TDD Time Division Duplexing
TPMI Transmitted Precoding Matrix Indicator
UCI Uplink Control Information
UE User Equipment
UL-SCH Uplink Shared CHannel

What is claimed is:

1. A method for device-to-device (D2D) resource allocation, comprising:
receiving, by a first user equipment (UE), downlink control information (DCI) from an access point (AP), wherein the DCI comprises a first D2D resource allocation and the first D2D resource allocation comprises a first resource allocation field for transmission of data;
setting, by the first UE, a second resource allocation field of a second D2D resource allocation of a sidelink control information (SCI) format according to the first resource allocation field;
determining that a first bandwidth of the first D2D resource allocation is different from a second bandwidth of the second D2D resource allocation and, based thereon, mapping by the first UE the first D2D resource allocation corresponding to the first bandwidth onto the second D2D resource allocation corresponding to the second bandwidth;
transmitting, by the first UE, the SCI format to one or more additional UEs; and
transmitting, by the first UE, the data according to the second D2D resource allocation.

2. The method of claim 1, further comprising:
transmitting, by the first UE, the second D2D resource allocation on the SCI format using SCI format 0, wherein the SCI format 0 comprises a same resource allocation field of the first D2D resource allocation as received on the DCI.

3. The method of claim 1, further comprising:
indicating a first bandwidth by a first value occupying a lowest frequency and a second value occupying a highest frequency corresponding to a physical resource block used for the first resource allocation; and
wherein the one or more additional UEs locates the first bandwidth according to the first value and the second value.

4. The method of claim 1, wherein the step of setting further comprises copying the first D2D resource allocation field to the second D2D resource allocation field.

5. The method of claim 1, wherein the step of setting further comprises copying and scaling the first D2D resource allocation field to the second D2D resource allocation field.

6. The method of claim 1, wherein the first D2D resource allocation is determined according to an uplink bandwidth by the AP.

7. The method of claim 6, further comprising:
converting, by the first UE, the first D2D resource allocation according to the uplink bandwidth to the second D2D resource allocation according to a sidelink bandwidth, wherein the sidelink bandwidth is used for data communication between the first UE and the one or more additional UEs.

8. The method of claim 1, further comprising:
transmitting, by the first UE, a bandwidth of the uplink band on a Physical Sidelink Broadcast Channel (PSBCH).

9. The method of claim 1, wherein the first D2D resource allocation is determined according to a sidelink bandwidth by the AP.

10. The method of claim 9, further comprising:
transmitting, by the first UE, a bandwidth of the sidelink band on a Physical Sidelink Broadcast Channel (PSBCH).

11. A user equipment (UE) comprising:
a memory storing instructions; and
one or more processors coupled to the memory, wherein the one or more processors execute the instructions to:
receive a downlink control information (DCI) from an access point (AP), wherein the DCI comprises a first device-to-device (D2D) resource allocation and the first D2D resource allocation comprises a first resource allocation field for transmission of data;
set a second resource allocation field of a second D2D resource allocation of a sidelink control information (SCI) format according to the first resource allocation field;
determine that a first bandwidth of the first D2D resource allocation is different from a second bandwidth of the second D2D resource allocation and, based thereon, map by the first UE the first D2D resource allocation corresponding to the first bandwidth onto the second D2D resource allocation corresponding to the second bandwidth;
transmit the SCI format to one or more additional UEs; and
transmit the data according to the second D2D resource allocation.

12. The UE of claim 11, wherein the one or more processors execute the instructions to
transmit the second D2D resource allocation on the SCI using a SCI format 0; and
wherein the SCI format 0 comprises a same resource allocation field of the first D2D resource allocation as received on the DCI.

13. The UE of claim 11, wherein the one or more processors execute the instructions to:
indicate the first bandwidth by a first value occupying a lowest frequency and a second value occupying a highest frequency corresponding to a physical resource block used for the first resource allocation; and
wherein the one or more additional UEs locate the first bandwidth according to the first value and the second value.

14. The UE of claim 11, wherein the one or more processors execute the instructions to:
copy the first D2D resource allocation field to the second D2D resource allocation field.

15. The UE of claim 11, wherein the one or more processors execute the instructions to:
copy and scale the first D2D resource allocation field to the second D2D resource allocation field.

16. The UE of claim 11, wherein the first D2D resource allocation is determined according to an uplink bandwidth by the AP, and wherein the one or more processors execute the instructions to:
convert the first D2D resource allocation according to the uplink bandwidth to the second D2D resource allocation according to a sidelink bandwidth, wherein the sidelink bandwidth is used for communication between the first UE and the one or more additional UEs.

\* \* \* \* \*